United States Patent [19]

Roese

[11] 4,021,846

[45] May 3, 1977

[54] LIQUID CRYSTAL STEREOSCOPIC VIEWER

[75] Inventor: John A. Roese, La Mesa, Calif.

[73] Assignee: The United States of America as represented by the Secretary of the Navy, Washington, D.C.

[22] Filed: Sept. 25, 1972

[21] Appl. No.: 292,201

[52] U.S. Cl. .................................. 358/92; 325/36; 325/66; 343/225; 350/133; 350/160 LC; 352/57; 352/63

[51] Int. Cl.$^2$ .................... H04N 9/58; G03B 35/16

[58] Field of Search ............ 350/150, 160 LC, 269, 350/132, 133; 250/272, 331; 325/36, 66; 343/225; 352/57, 63; 358/92; 178/6.5

[56] References Cited

UNITED STATES PATENTS

| | | | |
|---|---|---|---|
| 1,792,752 | 2/1931 | Michelssen | 350/150 |
| 2,055,584 | 9/1936 | Okolicsanyi | 350/150 |
| 3,261,977 | 7/1966 | Van Der Velden | 350/130 |
| 3,408,133 | 10/1968 | Lee | 350/150 |
| 3,576,364 | 4/1971 | Zanoni | 350/160 |
| 3,642,348 | 12/1972 | Wysocki | 350/160 |
| 3,659,111 | 4/1972 | Weaver | 350/150 |
| 3,731,986 | 5/1973 | Fergason | 350/150 |
| 3,737,567 | 6/1973 | Kratomi | 350/160 R |
| 3,756,694 | 9/1973 | Soree et al. | 350/160 LC |

Primary Examiner—Howard W. Britton
Attorney, Agent, or Firm—Richard S. Sciascia; Ervin F. Johnston; Thomas Glenn Keough

[57] ABSTRACT

An optical device, useful for three-dimensional stereo viewing not requiring any mechanical shuttering, including two liquid crystal lenses, each comprising: (1) a thin layer of liquid crystal material, preferably nematic liquid crystal; (2) two plates of conductively-coated transparent material enclosing the liquid crystal, each plate being connectable to a source of voltage, and each plate being insulated from the other; (3) a front polarizing sheet forming the outside surface of the crystal lens; and (4) a rear polarizing sheet forming the inner surface of the crystal lens. The axes of polarization of the front and rear polarizing sheets are at right angles to each other, with the result that maximum light transmission through each of the lenses occurs when no voltage is applied across the conductively-coated plates, and minimum light transmission occurs when a voltage is applied across the coated plates.

23 Claims, 6 Drawing Figures

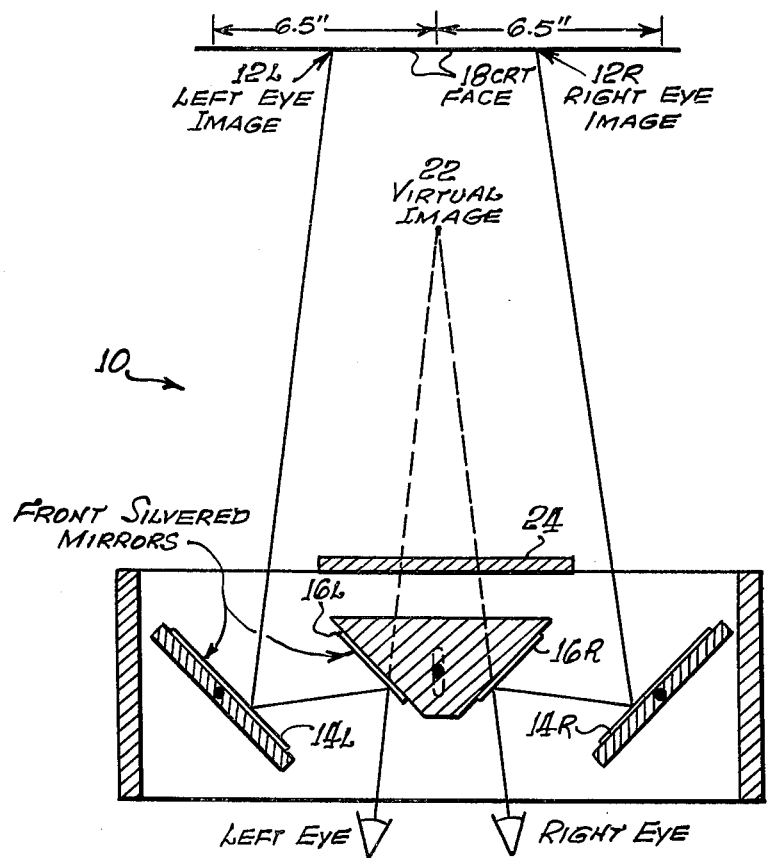
FIG. 1. (PRIOR ART) STEREO VIEWER CONSTRUCTION AND OPTICAL PATHS
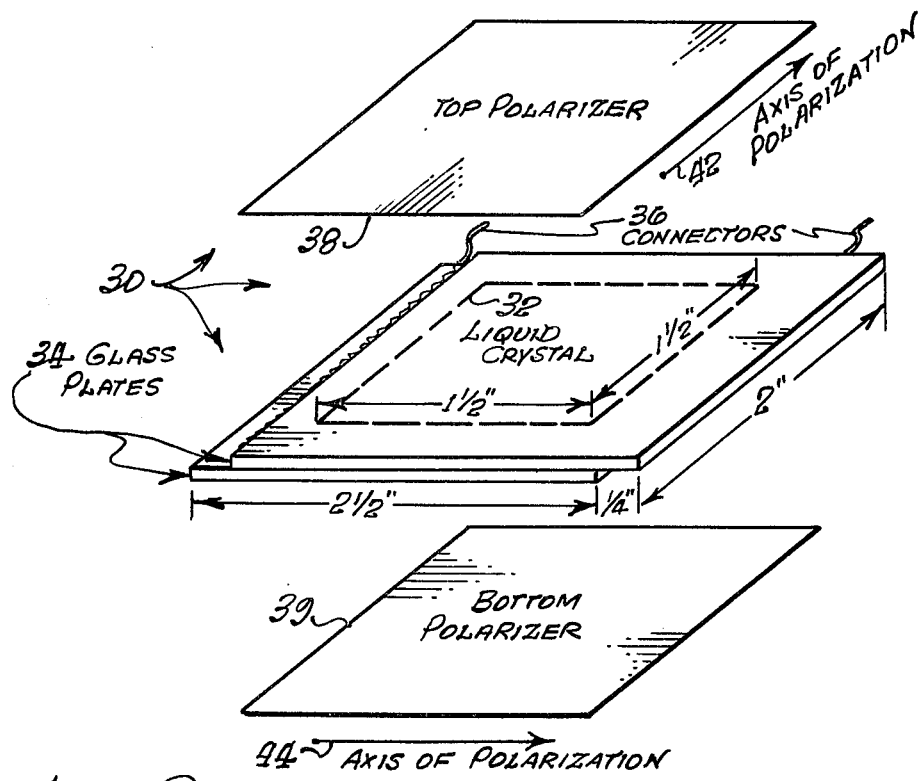
FIG. 2. LIQUID CRYSTAL LENS ASSEMBLY FOR EACH EYE.

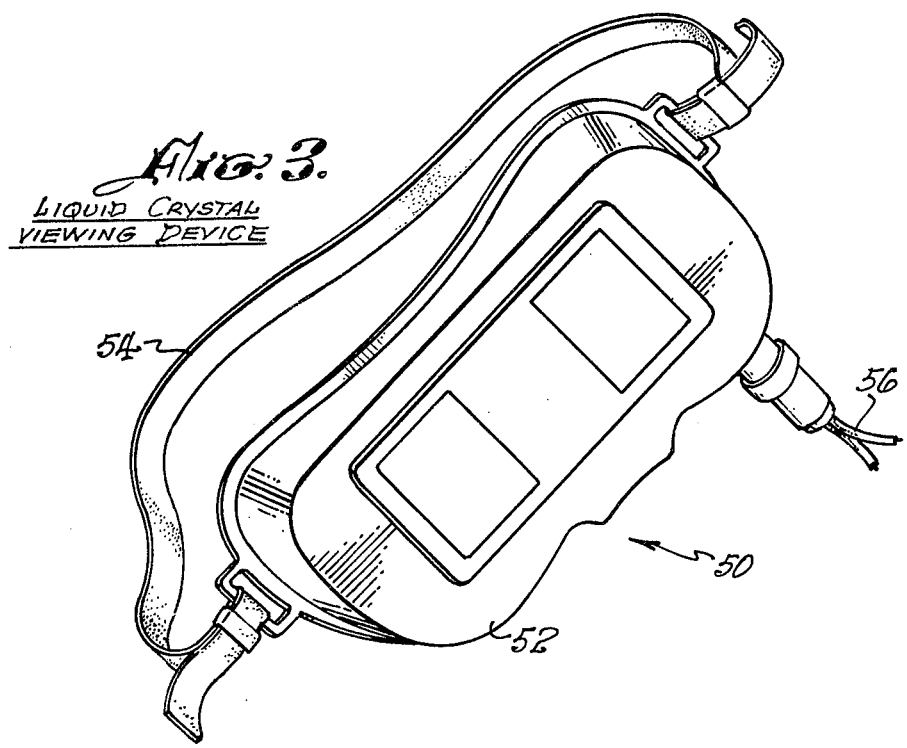
Fig. 3. LIQUID CRYSTAL VIEWING DEVICE
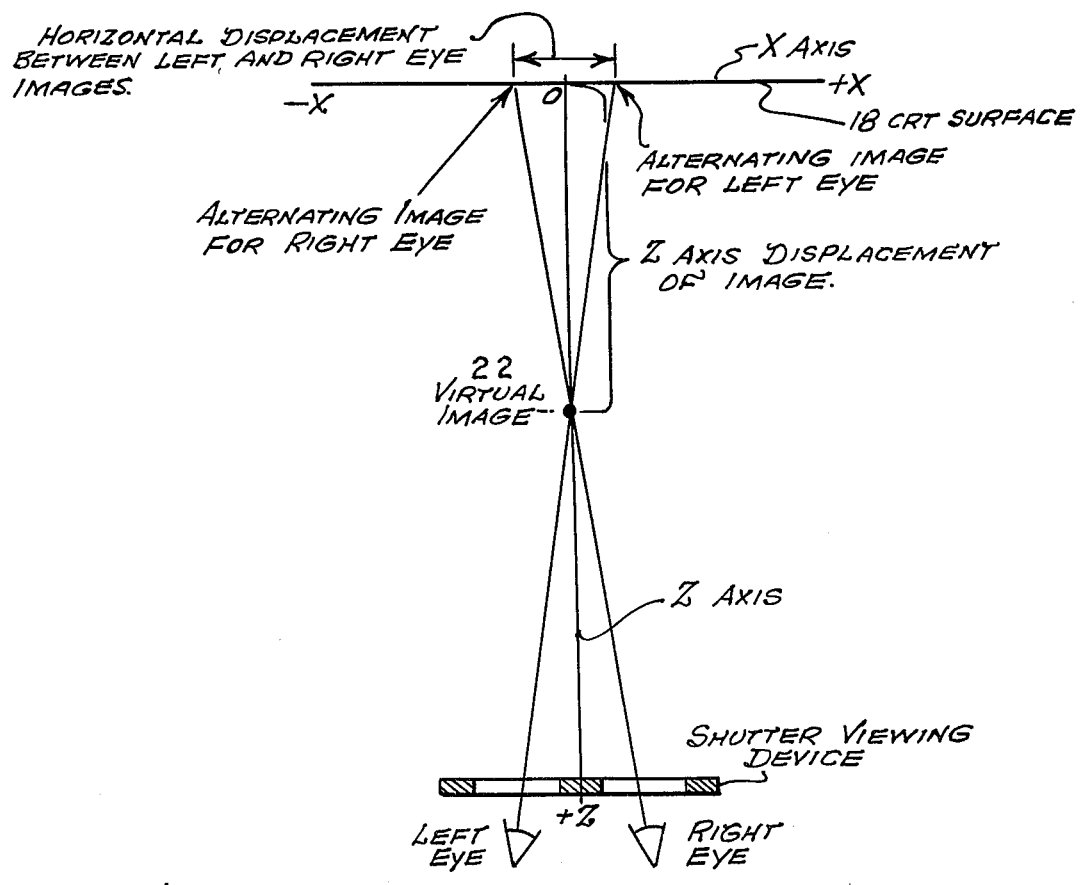
Fig. 4. DISPLAY GEOMETRY SHOWING DISPLACEMENT OF VIRTUAL IMAGE ALONG POSITIVE Z AXIS.

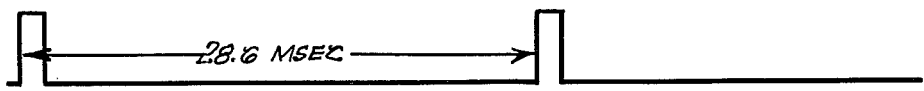
START OF FRAME PULSE
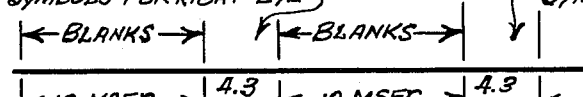
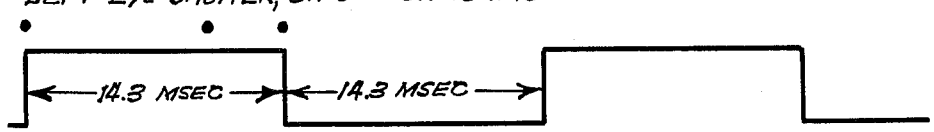
LEFT EYE SHUTTER, ON-OFF SWITCHING
LEFT EYE SHUTTER RESPONSE
RIGHT EYE SHUTTER, OFF-ON SWITCHING
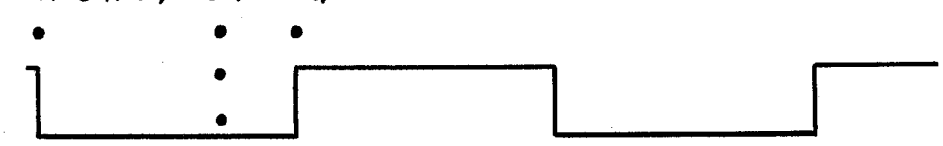
RIGHT EYE SHUTTER RESPONSE
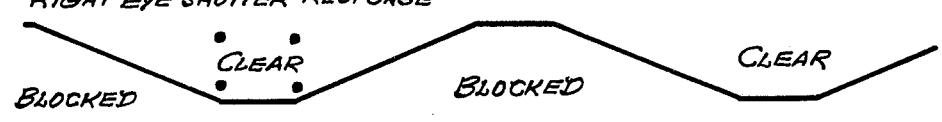
FIG. 5. TIMING DIAGRAM FOR IDEALIZED SHUTTER DEVICE.

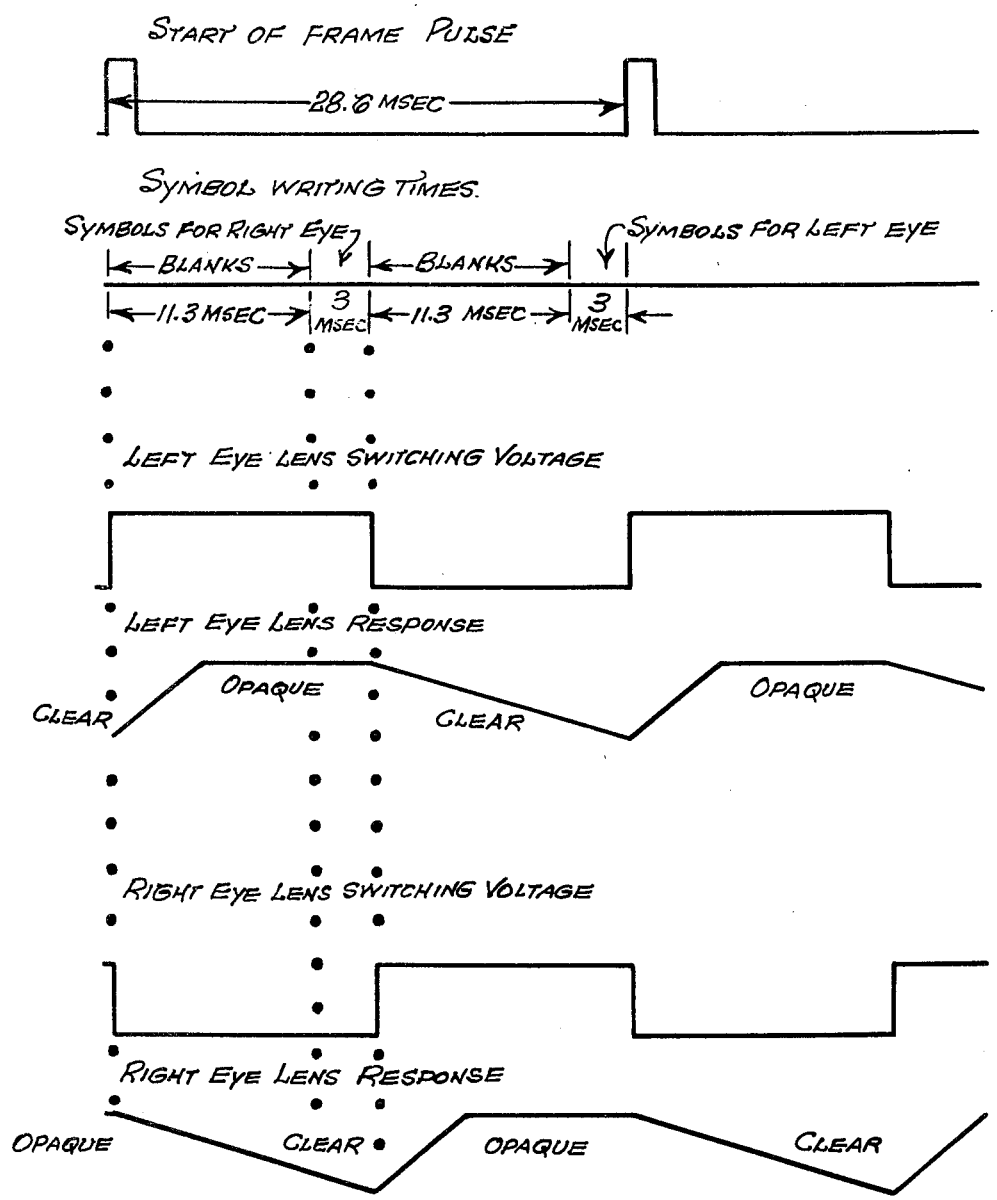
FIG. 6. TIMING DIAGRAM FOR LIQUID CRYSTAL LENSES.

LIQUID CRYSTAL STEREOSCOPIC VIEWER

STATEMENT OF GOVERNMENT INTEREST

The invention described herein may be manufactured and used by or for the government of the United States of America for government purposes without the payment of any royalties thereon or therefor.

BACKGROUND OF THE INVENTION

This invention relates to a new implementation of a stereoscopic shutter viewing device. All shutter-type steroesciple viewing devices operate on the principle of separately blocking and unblocking the view from each eye. The blocking is done in such a manner that whenever one eye has an unobstructed view of an object being observed, the other eye's view is blocked.

A three-dimensional presentation of complex data structures can be obtained when a shutter-type viewer is used in synchronism with a display device which can alternatively display and blank the images to be seen by each eye. Proper control over the rate at which each eye views the image of an object and correct horizontal displacement between the left and right eye images will result in a continuous three-dimensional representation of the object being viewed.

Electromechanical shutter-type viewing devices have been discussed in the prior art, and at least one such device is available commercially under the trade name "Lorgnette". Such devices perform their required function, but have certain disadvantages. The principle objection to these devices is the bulky design necessary to house the mechanical switching mechanisms for each eye. Other disadvantages are that a mechanical switching device will generally operate slower and have a shorter operational lifetime than an electronic device.

The liquid crystal stereoscopic viewer of this invention is an electronic shutter device as opposed to existing electro-mechanical devices. The switching action of each of the two liquid crystal lenses, one for each eye, is controlled by alternately applying and removing a voltage potential across the liquid crystal material for each lens. The resulting effect is that the entire lens assembly changes successively between transparent and opaque states, for first one lens assembly and then for the other.

As there is not requirement for a mechanical shutter mechanism in the liquid crystal viewer, the resulting liquid crystal viewer assembly is smaller and of lighter weight than existing electromechanical viewing devices. Head-mounted stereoscopic viewers employing liquid crystal lenses are completely practical due to this inherent small size and weight.

SUMMARY OF THE INVENTION

The nematic liquid crystal viewer incorporates two nematic liquid crystal lenses as a pair of viewing glasses. These lenses can be made to switch from a transparent to an opaque state with the application of a normal 4 vdc.

It should be noted that, with the exception of color, the design of the liquid crystal viewer retains all of the advantages of the prior art of the Lorgnette while at the same time reduces the size, which allows the viewing device to be worn by the observer as a pair of glasses. If the stereo pictures are exhibited on an oscilloscope in a console, this compact size allows the console operator to use both hands to operate all of the console entry devices while viewing a three-dimensional presentation.

Conceptually, the liquid crystal viewer operates in a manner similar to the Lorgnette. The difference is that the Lorgnette's electromechanical mechanism for alternately blanking each eye has been replaced with two liquid crystals lenses which act as low voltage, electronically controlled shutters.

The liquid crystal lenses were fabricated to specifications by the International Liquid Crystal Company, Cleveland, Ohio. Each lens assembly consists of a thin, 10–12 micron, layer of liquid crystal material, which is contained between two plates of conductively coated glass. A connector is soldered provide a the entire edge of each glass plate to a uniform voltage potential across the liquid crystal layer. The entire lens assembly, including the two polarizer sheets, is illustrated in FIG. 2.

The apparent effect of applying a voltage potential across the nematic liquid crystal lens is to cause a relaxation of the natural 90° rotation to the vibration of light waves passing through the lens. Thus, if the axes of the front and rear polarizing sheets are crossed, the relaxation which results when a voltage potential is applied allows the minimum transmission of light to occur. When the voltage is removed, the liquid crystal naturally rotates the light, and maximum light transmission occurs. In a similar fashion, if the axes of the polarizers are initially parallel to inhibit light transmission through the lens, application of a voltage potential will cause maximum transmission of light. The nematic liquid crystal lens requires typical times of 3 msec to change state when a voltage is applied and 11 msec to return to its original state after the voltage potential is removed.

OBJECTS OF THE INVENTION

An object of the invention is to provide a liquid crystal stereoscopic viewer which is completely electronic.

Another object of the invention is to provide a stereoscopic viewer which is compact and light enough to be head-mounted.

Yet another object of the invention is to provide a stereoscopic viewer which can be used in conjunctiom with a console capable of alternately producing and blanking left and right-eye stereo pictures.

Other objects, advantages, and novel features of the invention wll become apparent from the following detailed description of the invention, when considered in conjunction with the accompanying drawings.

BRIEF DESCRIPTION OF THE DRAWINGS

FIG. 1 is a diagrammatic view of a conventional prior art stereo viewer, and the optical paths involved.

FIG. 2 is a simplified view showing the basic elements of the liqud crystal lens assembly.

FIG. 3 is a pictorial view of the liquid crystal viewing device of this invention.

FIG. 4 is a diagram of the display geometry showing the displacement of the virtual image along the positive z axis, the axis of the cathode-ray tube on which the images to be viewed are formed.

FIGS. 5 and 6 are graphs, respectively, of the timing for an idealized shutter device and for the liquid crystal lenses of this invention.

DESCRIPTION OF THE PREFERRED EMBODIMENTS

The stereo viewer 10 of the prior art, shown in FIG. 1, optically merges to the left- and right-eye views, 12L and 12R, by a simple system of four front silvered mirrors, 14L, 14R and 16L, 16R, as opposed to the refracting stereoscope, also of the prior art, which employs wedge lenses. The physical layout and the optical ray paths obtained with this stereo viewer are shown in FIG. 1.

The requirements for side-by-side continuous views of the data structure to be displayed in three dimensions impose a constraint on the portion of the cathode-ray tube (CRT) face which can be used. For example, with a circular CRT face havinbg a 15-inch diameter, the masimum length of the sides of two horizontally adjacent square viewing regions can be shown to be $3\sqrt{5}$ inches, or approximately 6.72 inches. For convenience the side length was set at 6.5 inches, as shown in FIG. 1. This configuration provides for the maximum in square area viewing regions. However, these viewing regions account for only 48 percent of the total 15-inch-diameter viewing area. Considering that the left and right viewing regions are optically merged, the actual useful viewing region is only 24 percent of the CRT face 18.

This reduced CRT display area 18 is a definite disadvantage for viewing stereo-pair data structures. Conversely, an advantage of this technique, as opposed to other techniques which alternately generate and then blank symbols during each frame, is that both the left and the right-eye symbols, forming the left and right images 12L and 12R, are displayed continuously (flicker-free) in separate locations on the CRT. Thus, there are no switching problems within a frame or losses in symbol brightness levels. Up to one-half of the symbols on each frame can be displayed for each eye; or equivalently, a maximum of either 1750 symbols at 35 frames/second or 1250 symbols at 50 frames/second can be presented in three dimensions, with the console employed.

Several positional and angular adjustments may be incorporated in the stereo viewer 10 design. These adjustments allow the stereo viewer 10 to accommodate different observers and permit experiments with different format geometries.

As with the refracting stereoscope of the prior art, the virtual image 22 which is displaced out from the face 18 of the CRT, as shown in FIG. 1, is produced when the left- and right-eye images 12L and 12R are optically merged. The stereo viewer 10 correctly aligns the left- and right-eye images 12L and 12R when the outer two mirrors 14L and 14R of the stereo viewer 10 are properly adjusted to cause the 6.5 inch-square viewing regions 18 to be superimposed. The partition 24 shown along the back of the stereo viewer 10 blocks the extraneous image which would otherwise be seen by each eye.

Referring now to FIG. 2, this figure shows an exploded view of an optical device, useful for three-dimensional stereo viewing not requiring any mechanical shuttering, comprising two liquid crystal lenses 30, one of which is shown, each comprising a thin layer of liquid crystal material 32, in the range of 11 microns thick. Two plates of conductively-coated transparent material 34 enclose the liquid crystal material 32, each plate beng connectable to a source of voltage by connectors 36, and each plate being insulated from the other. A top polarizing sheet 38 forms the outside surface of the crystal lens 30, and a bottom polarizing sheet 39 forms the inner surface of the crystal lens, the axis of polarization 42 of the top polarizing sheet being at an angle to the axis of polarization 44 of the bottom polarizing sheet.

Generally, the liquid crystal is a nematic liquid crystal, and the axis of polarization, 42 and 44, of the top and bottom polarizing sheets, 38 and 39, are at right angles to each other; with the result that maximum light transmission through each of the lenses 30 occurs when no voltage is applied across the conductively-coated plates 34, and minimum light transmission occurs when a voltage is applied across the coated plates 34.

In another embodiment, the axes of polarization of the front and rear polyarizing sheets, 42 and 44, may be parallel to each other, with the result that maximum light transmission through each of the lenses 30 occurs when a voltage is applied across the conductively-coated plates 34, and minimum light transmission occurs when no voltage is applied across the plates.

As is shown by the embodiment 50 of FIG. 3, for practical use the optical device would generally include a frame for supporting the otical device, the frame being capable of being mounted, for example by strap 54, to the head of an observer for hand-free use.

The viewing device 50 shown in FIG. 3 would generally be connected, for example by cable 56, to a voltage source (not shown) which includes a control means (also not shown) for alternately and successively applying a voltage to each lens 30, the left and the right; so that if left and right stereo pictures 12L and 12R are alternately and successively displayed on the CRT of the console in synchronism with the application of the voltage to the lenses 30, three-dimensional stereo viewing results.

Means may be provided for displaying left and right stereo pictures 12L and 12R. Means may also be provided for controlling the selective display of the left or right stereo pictures, 12L and 12R, in synchronism with the maximum transmission of light through the left or right lens, respectively, resulting in three-dimensional viewing of stereo pictures.

The liquid crystal viewing device of FIG. 3 need not have the cable 56 in all embodiments, it being well within the state of the art to transmit synchronizing signals by wireless means from the source of stereo pictures, such as a console, to the stereo viewing device 50 itself.

Discussing now the geometrical relationship involved in stereo viewing, it is convenient to define a volumetric coordinate system $x, y, z$ when discussing the mathematical relationships required to compute the coordinates for the left- and right-eye views for an object with a given displacement from the CRT. Reference is directed to FIG. 1. The origin (0,0,0) of this coordinate system is defined to be at the center of the face 18 of the CRT. With respect to the observer, the positive $x$ axis is to the right and the positive $y$ axis is up. The positive $z$ axis extends outward from the center of the CRT toward the observer.

A significant result of the display geometry shown in FIG. 1 is that the two outer mirrors 14L and 14R of the stereo viewer are adjusted so that whenever two identical symbols having the same $y$ coordinate are displaced in $x$ by 6.5 inches, the two symbols, when observed through the stereo viewer 10, are merged into a single symbol with a z displacement of zero. Thus, the virtual image 22 of the symbol is in the plane defined by the face 18 of the CRT.

Positive displacement along the z axis is obtaind by reducing the horizontal displacement between the two symbols, from a maximum of 6.5 inches to an experimentally arrived at minimum of about 5.5 inches. A continuous reduction in the horizontal separation of less than one inch causes the merged symbol to appear to move toward the observer along the positive z axis. The maximum apparent z-axis-displacement is approximately three inches and corresponds to the minimum 5.5-inch-horizontal displacement. To achieve the effect of moving straight out from the CRT face toward the observer, both symbols to be merged are moved equal distances toward the origin along the x axis.

In the design of three-dimensional CRT display formats it is necessary to specify the location of each alphanumeric, data symbol, etc., to be displayed in terms of its spatial coordinates $x, y, z$. For each symbol so specified, the coordinates of two identical symbols positioned in the left- and right-eye stereo-viewing areas must be computed. Let the coordinates of the left- and right-eye symbols be designated as $x_L, y_L$ and $x_R, y_R$, respectively.

Based on the previous definition of the origin, empirical relationships have been derived for computing $x_L$, $y_L$ and $y_R, y_R$, given $x, y, z$. These relationships in units of inches, are $$x_L = \frac{z}{6} - 3.25, \quad y_L = y\left(\frac{20.5}{20.5 - z}\right) \quad (1)$$

$$x_R = -\frac{z}{6} + 3.25, \quad y_R = y\left(\frac{20.5}{20.5 - z}\right) \quad (2)$$

With these relationships excellent results have been achieved in numerous static and dynamic three-dimensional display formats.

Three-dimensional formats which have been successfully implemented on the console used include both tactical and data analysis presentations. Each is designed for stereo viewer observation. Most of the formats have incorporated one or more interactive features which allow the console operator to response to the true three-dimensional presentation of the data structure. For instance, the operater can move a trackball cursor symbol to any position within the three-dimensional presentation and isolate a single point or a concentration of points. This is accomplished first with the $x, y$ motion of the console trackball which positions the cursor in the plane of the CRT face ($z=0$). When the trackball is correctly positioned, the operator selects the specified console action entry switch which changes the function of the trackball to control movement of the cursor along the z axis. In the case of z axis cursor motion, the y coordinate of the trackball motion controls the z axis displacement, while the x coordinate motions are ignored. By again selecting the appropriate action entry switch, the operator can resume controlling the cursor in the new ($z$=constant) plane. Thus, the cursor can be rapidly positioned to any desired point in $x, y, z$ when the trackball is moved and the appropriate action entry switches are selected.

As an indication of the capabilities of the stereo apparatus, a rectangular parallelepiped, which is a six-sided solid object with 90° interior angles, was programmed to be displayed on the CRT. Novel features of this format include the ability to rotate the parallelpiped at a selectable distance about an arbitary axis which is parallel to the $x, y$, or $z$ axis. Also, translations in $x, y$ and $z$ directions can be accomplished with z axis translations which produce an exaggerated increase or decrease in object size, depending on whether the movement along the z axis is toward or away from the observer.

A technique that compensates for the primary disadvantage of the continuous image display-utilization of only 24 percent of the CRT viewing area — is the alternating image stereo-pair display. Basically, this procedure displays the image for one eye while at the same time completely blocking off the field of view of the other eye. The process is then reversed to accommodate image display for the other eye, while the first eye is, in turn, blocked off. If this entire sequence is repeated at a rate which exceeds the critical flicker frequency for the system under consideration, then the observer will merge the alternately displayed left- and right-eye images into a single nonfilckering or continuous image.

To perform this sequence of events, it is apparent that a shutter-like viewing device must be employed that alternately blocks the view of each eye in synchronism with the left- and right-eye images displayed on the CRT. Two such devices are the Lorgnette stereo viewer of the prior art and the nematic liquid crystal viewer of this invention.

The characteristics of the console used have proven to be nearly ideal for displaying alternating image stereoscopic formats and for providing synchronization signals to the viewing device. Two avenues of approach were considered for use with the console; display the respective images for the left- and right-eye on alternating frames; and display and blank the images for both eyes during different portions of the same frame. As the console displays only symbols which are stored in its internal refresh memory, the first aproach would have required that the contents of the refresh memory be changed each frame. Although the refresh memory is capable of being loaded at the required rate, the UNIVAC 1230 computer which drives the console would also have to be synchronized with the display frame rate. This problem prohibited the selection of the first approach, since logic modifications would be required to establish a synchronization link with the computer, therefore, the second approach was employed.

The success of the second approach, although console hardware modifications were not required, depended both on the speed of the shutter device and on the persistence of the CRT phosphor. The phosphor employed was a P31 phosphor which decays to 10 percent of its original intensity in approximately 40 $\mu$sec. In order to maximize the frame duration to allow for slow shutter speeds, a 35 frames/sec (28.6 msec/frame) rate was selected. FIG. 5 illustrates a timing diagram for an idealized shutter-symmetrical on-off and off-on in less than 10 msec. This diagram shows two idealized features: first, for the console's average symbol deflection and settling time of 8 $\mu$sec, approximately 540 symbols can be generated during the 4.3 msec available for each eye; and second, the rapid P-31 phosphor decay time will insure that decaying traces of the symbols displayed for one eye will not be seen by the other eye.

As with the stereo viewer, there are geometric constraints which determine how the three-dimensional effect can be achieved. If the symbol viewed by the left eye and the symbol viewed by the right eye are alternately displayed at the same position on the CRT face, then the z axis displacement of the merged symbol will be zero. However, if the symbol for the left eye is horizontally displaced to the right of the symbol for the right eye, then the virtual image of the merged symbol will have a positive z axis displacement. The amount of z axis displacement varies with the horizontal distance separating the left- and right-eye symbols. Finally, the maximum left- and right-eye symbol separation distance is 15 inches. This separation can produce a three-dimensional image only if the $x$ and $y$ symbol coordinates are equal to zero, which allows both the left- and the right-eye symbols to remain on the CRT fact. Thus, for symbols where the $x$, $y$ coordinates are close to the edge of the CRT face, the amount of possible z axis displacement is small. However, this value increases to its maximum as $x$ and $y$ approach the origin.

The mathematical relationships governing the conversion from $x$, $y$, $z$ symbol coordinates to coordinates for the left- and right-eye symbols, $x_L$, $y_L$ and $x_R$, $y_R$, are given below in units of inches.

$$x_L = x + z \frac{(1.25)}{(16.5 - z)} \quad y_L = y \frac{(16.5)}{(16.5 - z)} \quad (3)$$

$$x_R = x - z \frac{(1.25)}{(16.5 - z)} \quad y_R = y \frac{(16.5)}{(16.5 - z)} \quad (4)$$

Thus, computer programs designed to emplement three-dimensional display formats whose symbols are specified in terms of $x$, $y$, $z$ can easily be writted that will generate the necessary coordinates for the corresponding alternating left- and right-eye symbols.

The timing diagram for the liquid crystal lenses shown in FIG. 6 was constructed from the rise and fall times for the liquid crystal lens, and illustrates that within a 28.6 msec/frame time approximately 375 data symbols can be displayed for each eye during the 3 msec available. For this illustration it was assumed that each liquid crystal lens and its polarizers were configured to allow minimum light transmission with an applied voltage potential. It can be seen that the maximum transmission state is not completely achieved by the time symbols are viewed through each lens. However in actual operation the visual effect is minor with the images slightly dimmer than they would be if the view were totally unobstructed.

Thus, the liquid crystal viewer offers a fast, lightweight, electronically switched viewing device that is operated at safe voltage levels and can be worn in the same manner as a pair of glasses. The computer programs to generate three-dimensional data presentations are simple and the operator can look at either standard two-dimensional formats and indicator lights or three-dimensional formats, without removing the viewer.

Obviously many modifications and variations of the present invention are possible in the light of the above teachings. It is therefore to be understood that within the scope of the appended claims the invention may be practiced otherwise than as specifically described.

What is claimed is:

1. An optical device, useful for three-dimensional stereo viewing not requiring any mechanical shuttering, comprising:
 two liquid crystal lenses, each comprising:
  a thin layer of liquid crystal material;
  two plates of conductively-coated transparent material enclosing the liquid crystal, each plate being connectable to a source of voltage, and each plate being insulated from the other;
  a front polarizing sheet forming the outside surface of the crystal lens; and
  a rear polarizing sheet forming the inner surface of the crystal lens;
  the axis of polarization of the front polarizing sheet being at an angle to the axis of polarization of the rear polarizing sheet.

2. The optical device according to claim 1, wherein: the liquid crystal is a nematic liquid crystal.

3. The optical device according to claim 2, wherein the axes of polarization of the front and rear polarizing sheets are at right angles to each other;
 with the result that maximum light transmission through each of the lenses occurs when no voltage is applied across the conductively-coated plates, and minimum light transmission occurs when a voltage is applied across the coated plates.

4. The optical device according to claim 2, wherein the axes of polarization of the front and rear polarizing sheets are parallel to each other;
 with the result that maximum light transmission through each of the lenses occurs when a voltage is applied across the conductively-coated plates, and minimum light transmission occurs when no voltage is applied across the plates.

5. The optical device according to claim 3, further comprising:
 a frame for supporting the optical device, the frame being capable of being mounted to the head of an observer for hand-free use.

6. The optical device according to claim 5, further comprising:
 a voltage source.

7. The optical device according to claim 6, wherein the voltage source includes a control means for alternately and successively applying a voltage to each lens, the left and the right;
 so that if left and right stereo pictures are alternately and successively displayed in synchronism with the application of the voltate to the lenses, three-dimensional stereo viewing results.

8. A stereoscopic apparatus comprising:
 a stereopair reproducing means for displaying right-eyed and left-eyed pictures of stereopairs alternately on its screen at short alternate time intervals;
 a synchronizing signal generator associated with said stereopair reproducing means and generating synchronizing signals in synchronism with alternation of said right-eyed and left-eyed pictures;
 at least one viewer comprising a pair of liquid crystal filters, each of said filters being adapted to cover the right and left eyes of an observer, respectively, each filter having at least one layer of liquid crystal held in the form of a film and at least one set of transparent electrodes, the transparency of said liquid crystal filters being dependent upon the electric field intensity generated by said electrodes; and
 at least one viewer controller receiving said synchronizing signals generated by said synchronizing signal generator and controlling the power applied to said electrodes to thereby vary the electric field and the transparency of said liquid crystal filters such that a pair of said liquid crystal filters covering the right and left eyes respectively of an observer alternately exchange transparency and translucency in synchronism with each other and in synchronism with alternation of said right-eyed and left-eyed pictures being displayed by said stereopair reproducing means.

9. Apparatus as claimed in claim 8 wherein said synchronizing signals are coupled to said at least one viewer controller by means of wires connecting said synchronizing signal generator to said at least one viewer controller.

10. Apparatus as claimed in claim 8 wherein said synchronizing signal generator includes a radio transmitter and said viewer controllers include a radio receiver, said synchronizing signals being coupled to said at least one viewer controlled by means of radio.

11. Apparatus as claimed in claim 8 wherein said synchronizing signal generator generates synchronizing signals having identical code formats in synchronism with alternation of said right-eyed and left-eyed pictures.

12. Apparatus as claimed in claim 8 wherein said synchronizing signal generator generates a synchronizing signal for exclusive one of the right and left eyes, correspondng to disappearance of the opposite eye picture and persisting until the other eye picture disappears.

13. Apparatus as claimed in claim 8 wherein said viewer controller is at least partially appendant to said stereopair reproducing means.

14. Apparatus as claimed in claim 13 wherein said viewer controller is integrated with said synchronizing signal generator.

15. Apparatus as claimed in claim 8 wherein said synchronizing signal generator generates two types of synchronizing signals alternately, signal for the right eye being coupled to the left eye filter and corresponding to disappearance of the left-eyed pictures, and signal for the left eye being coupled to the right eye filter and corresponding to disappearance of the right-eyed pictures.

16. Apparatus as claimed in claim 15 wherein said synchronizing signal for the right eye persists until the right-eyed picture disappears and said synchronizing signal for the left eye persists until the left-eyed picture disappears.

17. Apparatus as claimed in claim 8 wherein said stereopair reproducing means includes a screen on which pictures are reproduced by means of at least one light spot varying its brightness and scanning the screen.

18. Apparatus as claimed in claim 17 wherein said stereopair reproducing means is a television receiver, and wherein said synchronizing signal generator generates synchronizing signals each time said light spot completes scanning one frame.

19. Apparatus as claimed in claim 8 wherein each liquid crystal filter of said at least one viewer device further includes at least one pair of transparent plates; and said at least one layer of liquid crystal being held in the form of film between said pair of transparent plates, the transparency of said liquid crystal film being dependent on the electric field intensity; said at least one set of transparent electrodes being so arranged to effectively change the electric field intensity to control transparency of said liquid crystal film of the filter.

20. Apparatus as claimed in claim 19 wherein each plate of said pair of transparent plates of said liquid crystal filter has a surface in contact with said liquid crystal film, said contacting surface being coated with electrically conductive and transparent material to form said set of transparent electrodes.

21. Apparatus as claimed in claim 8 wherein said viewer controller comprises switching circuit for connecting and disconnecting said electrodes of said liquid crystal filters with a power source responsive to said synchronizing signals such that the filter covering the right eye and the other filter covering the left eye of an observer alternately exchange transparency and translucency in synchronism with each other according to the synchronizing signals transmitted from said synchronizing signal generator.

22. Apparatus as claimed in claim 21 wherein said power source is a direct current source.

23. Apparatus as claimed in claim 21 wherein said power source is an alternating current source.

* * * * *

UNITED STATES PATENT AND TRADEMARK OFFICE
CERTIFICATE OF CORRECTION

PATENT NO. : 4,021,846
DATED : 3 May 1977
INVENTOR(S) : John A. Roese

It is certified that error appears in the above-identified patent and that said Letters Patent are hereby corrected as shown below:

Column 2, line 14, delete "provide a" and insert -- along --;

line 15, after "to" insert -- provide --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks